July 1, 1924.　　　　　　　　　　　　　　　　1,499,480
F. W. SEECK
DIFFERENTIAL MECHANISM
Filed June 1, 1922
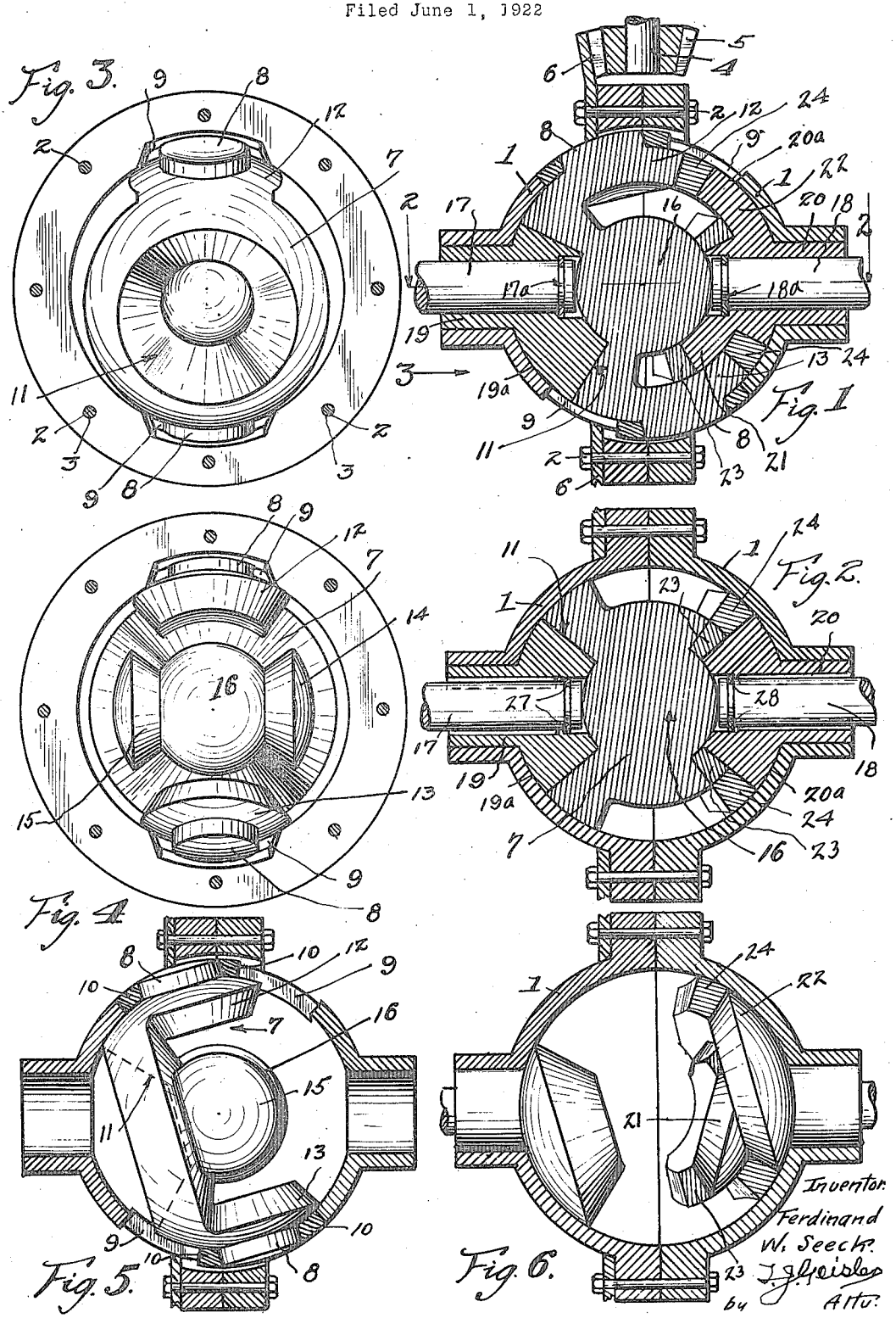

Patented July 1, 1924.

1,499,480

UNITED STATES PATENT OFFICE.

FERDINAND W. SEECK, OF LEBANON, OREGON.

DIFFERENTIAL MECHANISM.

Application filed June 1, 1922. Serial No. 565,029.

*To all whom it may concern:*

Be it known that I, FERDINAND W. SEECK, a citizen of the United States, and a resident of Lebanon, county of Linn, and State of Oregon, have invented a certain new and useful Improvement in Differential Mechanism, of which the following is a specification.

The object of my invention is to provide a simple gearless power transmitting mechanism which is adapted to drive the sections of a divided axle simultaneously at the same rate, and at the same time permit each of the axle sections to have a relatively different rate of rotation as required in driving over curves in the road.

A further object is to simplify the structure shown in my Patent No. 1,278,231, issued Sept. 10, 1918. In the present invention I have provided parts which operate similarly, but which are built to withstand greater power, and are capable of being manufactured with a fewer number of parts than the structure described in my said patent.

A further object is to provide a differential mechanism of the character referred to consisting of a transmission element mounted to oscillate, cam disks revolubly mounted in the opposite sides of said transmission element, and two shafts inserted into the opposite sides of said transmission member eccentrically thru their disks, the transmission element being held against longitudinal motion on the axis on which it oscillates by being adapted to accommodate angular displacement of said disks.

A further object is to provide a differential mechanism consisting of driven case, axle sections journaled in opposite sides of the case, an eccentric portion carried by each axle section, a transmission element located between the axle sections, coupling the eccentric portions thereof, having rotary motion about an axis normal to and intersecting the line of said axle sections, and also oscillatory motion in the plane in which the axle sections lie in said normal axis lie.

A further object is to provide a differential mechanism in which the transmission elements are made in one unitary piece and consist of a body portion having integral perpendicular portions arranged at 90° to each other, said transmission member being located between the axle sections and coupling the eccentric portions thereof and having rotary motion about an axis normal to and intersecting the line of said axle sections, and also oscillatory motion in the plane in which the axle sections and said normal axis lie.

The above mentioned and incidental features I have illustrated in the accompanying drawings, in which:

Fig. 1 is a longitudinal section of my improved differential mechanism;

Fig. 2 is a similar longitudinal section taken on the line 2—2 of Fig. 1;

Fig. 3 is a section taken as shown by the arrow 3 on Fig. 1 of my differential mechanism with one-half of the casing and one shaft removed;

Fig. 4 is a view of the opposite side of the member and casing shown in Fig. 3;

Fig. 5 is a view similar to Fig. 1 except that the axles and eccentric elements have been removed and the transmission member is shown in full; and Fig. 6 is a similar view except that the axle and eccentric member are shown in full and the transmission member has been removed.

The construction and operation of my invention is as follows: The principle involved in my gearless differential is the same as in the ordinary form of gear differential except that eccentric elements have been used instead of gear elements. The differential mechanism is enclosed in a casing 1. The casing 1 is split and held together by bolts 2 which are placed thru the holes 3. Power is received from the propelling shaft 4 thru the baffle pinion 5 which meshes with the ring gear 6 which is bolted to the differential casing 1. The parts enumerated so far are similar to the standard forms of gear differential as now manufactured. The transmission member 7 is positioned transversely between the sections of the casing 1. The projections 8 on the member 7 are adapted to ride in the slots 9 in the case 1. These may be made with wearing portions 10 so as to give larger bearing surfaces against the sides of the slot. The member 7 is made with an eccentric recess 11. On the other side are curved projections 12, 13, 14 and 15. These are mounted around the partially spherical center piece 16 of the member 7. The members 12, 13, 14 and 15 are made concave on their inner and convex on their outer surfaces and are positioned concentric with the center piece 16. The members 12 and 13 are slightly higher than the members 14 and 15 and all are made with tapered edges. The members 12 and 13 lie on axis normal to the one on which the members 14 and 15 lie and so these projections are 90° apart. The projections 8 are mounted on the members 12 and 13 and the outer surfaces of these members bear on the inner surfaces of the casing 1. Shafts 17 and 18 are fixed to eccentric members 19 and 20 respectively. These eccentric members have eccentric portions 19ª and 20ª respectively which bear in the shell 1. The shaft 17 fixed to the eccentric member 19 is mounted in the recess 11 of the member 7 and the shaft 18 fixed to the eccentric member 20 is mounted between the projections 12, 13, 14 and 15. Both shafts bear against the partially spherical center piece 16 of the member 7. The eccentric member 20 is made with two eccentric portions 21 and 22 which are positioned preferably 180° apart. The eccentric portion 21 cooperates with the projections 14 and 15 and the eccentric portion 22 cooperates with the projections 12 and 13. A wearing washer 23 is mounted on the eccentric portion 21 and a similar wearing washer 24 is mounted on the projecting eccentric 22. The shafts 17 and 18 are fixed to the eccentric elements 19 and 20 respectively by means of keys 25 and 26. They are prevented from moving laterally by split washers 27 and 28 which are mounted in the recesses 17ª and 18ª, respectively.

The operation of my device is as follows: As is well known, a differential allows differential motion between the two driving wheels of a vehicle and consists of mechanism which allows two shafts to revolve oppositely. Thus it can be seen that when one eccentric member rotates the transmission member 7 must oscillate so as to allow the eccentric portions to pass and thus as the opposite eccentric member is in contact with the transmission member it must rotate backwards. Thus it can be seen that this will give a differential motion between the wheels.

I claim:

1. In a differential mechanism, a driven case, axle sections journaled in opposite sides of the case, an eccentric portion carried by each axle section, a transmission element located between the axle sections, coupling the eccentric portions thereof, the case and transmission element being respectively provided with slots and trunnions bearing in the slots, thereby permitting the transmission element rotary motion about an axis normal to and intersecting the line of said axle sections, and also oscillatory motion in the plane in which the axle sections and said normal axis lie.

2. In a differential mechanism, a driven case, axle sections journaled in opposite sides of the case, an eccentric portion carried by each axle section, a transmission element comprising a body portion having integral perpendicular portions disposed at 90° to each other, the said transmission member being located between the axle sections and coupling the eccentric portion thereof, the case and transmission element being respectively provided with slots and trunnions bearing in the slots, thereby permitting the transmission element rotary motion about an axis normal to and intersecting the line of said axle sections, and also oscillatory motion in the plane in which the axle sections and said normal axis lie.

3. In a differential mechanism, a driven case, axle sections journaled in opposite sides of the case, an eccentric portion carried by each axle section, a transmission element located between the axle sections, coupling the eccentric portions thereof, the case and transmission element being respectively provided with slots and trunnions bearing in the slots, thereby permitting the transmission element rotary motion about an axis normal to and intersecting the line of said axle sections, and also oscillatory motion in the plane in which the axle sections and said normal axis lie, and filler rings between the opposed faces of said transmission member and said eccentric portions.

4. In a differential mechanism, a driven case, axle sections journaled in opposite sides of the case, an eccentric portion carried by each axle section, a transmission element comprising a body portion having integral perpendicular portions disposed at 90° to each other, the said transmission member being located between the axle sections and coupling the eccentric portion thereof, the case and transmission element being respectively provided with slots and trunnions bearing in the slots, thereby permitting the transmission element rotary motion about an axis normal to and intersecting the line of said axle sections, and also oscillatory motion in the plane in which the axle sections and said normal axis lie, and filler rings between the opposed faces of said transmission member and said eccentric portions.

5. In a differential mechanism, a driven case, axle sections journaled in opposite sides of the case, an eccentric portion carried by each axle section, a transmission element located between the axle sections, coupling the eccentric portions thereof, having rotary motion about an axis normal to and intersecting the line of said axle sections, and also a pin and groove connection with the case which permits oscillatory motion in the plane in which the axle sections and said normal axis lie.

6. In a differential mechanism, a driven case, axle sections journaled in opposite sides of the case, an eccentric portion carried by each axle section, a transmission element comprising a body portion having integral perpendicular portions disposed at 90° to each other which constitute connections to one of said eccentric portions, said transmission member being located between the axle sections and coupling the eccentric portions thereof, and having rotary motion about an axis normal to and intersecting the line of said axle sections and also oscillatory motion in the plane in which the axle sections and said normal axis lie.

7. In a differential mechanism of the character referred to, in combinaion, a transmission element mounted to oscillate, eccentric portions revolubly mounted on opposite sides of said transmission element, two axle sections mounted at opposite sides of said transmission member, the eccentric portions mounted on the inner ends thereof, the transmission element being held against longitudinal motion on the axis about which it oscillates, but being adapted to accommodate the angular displacement of said eccentric portions, substantially as described.

8. In a differential mechanism, a driven case axle sections journaled in opposite sides of said case, the inner ends each provided with an eccentric portion, and a rotatable transmission element, mounted in said case between said axle sections, and having direct connection with said case, said connections permitting rotation and oscillation of said transmission member, but said case preventing lineal displacement on its axis of rotation.

9. In a differential mechanism, axle sections at each side provided with circular eccentric portions, a rotatable transmission member coupling the eccentric portions, one side of the transmission member being provided with a circular cavity in which the eccentric portion of one axle section bears, and means for holding said transmission member against lineal movement along its axis of rotation but permitting it oscillatory motion thereon.

10. In a differential mechanism, axle sections at each side provided with circular eccentric portions, and a rotatable transmission member located between the axle sections coupling the eccentric portions thereof, the rotatable transmission member being provided with a convex central portion and the eccentric portion of one axle section being provided with a concaved surface adapted to seat on the convex portion of the transmission member, and means for holding said transmission member against lineal movement along its axis of rotation but permitting it oscillatory motion thereon.

11. In a differential mechanism, axle sections provided with circular eccentric portions, a transmission member located between the axle sections coupling the eccentric portions thereof, the transmission member being provided with a convex central portion and the eccentric portions of the axle sections being provided with concaved surfaces seated on the convex portion of the transmission member, one side of the transmission element being provided with an eccentric circular cavity in which the eccentric portion of one axle section bears.

12. In a differential mechanism, a driven case, axle sections at each side provided with circular eccentric portions, and a rotatable transmission member coupling the eccentric portions, one side of the transmission member being provided with a circular cavity in which the eccentric portion of one axle sections bears, said rotatable transmission element bearing against the inner face of said case, the inner face of said case being provided with means for holding said transmission member against lineal movement along its axis of rotation but permitting it oscillatory motion thereon.

13. In a differential mechanism, axle sections provided with circular eccentric portions, a transmission member coupling the eccentric portions, one side of the transmission member being provided with an eccentric circular cavity in which the eccentric portion of one axle section bears, the opposite side of the transmission member having perpendicular circular portions engaging the eccentric portion of the other axle section, the transmission element being arranged to have both rotary and oscillatory motion thereby to accommodate the angular displacement of said eccentric portions without the lineal displacement of said transmission member on its axis of rotation.

14. In a differential mechanism, axle sections provided with circular eccentric portions, a transmission member located between the axle sections coupling the eccentric portions thereof, the transmission member being provided with a convex central portion and the eccentric portions of the axle sections being provided with concaved surfaces seated on the convex portions of the transmission member, one side of the transmission member being provided with an eccentric circular cavity in which the eccentric portion of one axle section bears, the opposite side of the transmission member having perpendicular circular portions engaging the eccentric portion of the other axle section, the transmission element being arranged to have both rotary and oscillatory motion thereby to accommodate the angular displacement of said eccentric portions without the lineal displacement of said transmission member on its axis of rotation.

FERDINAND W. SEECK.